United States Patent [19]
Robinson

[11] 3,946,886
[45] Mar. 30, 1976

[54] TOWING DEVICE FOR SMALL PLANES AND THE LIKE

[75] Inventor: Harold R. Robinson, Des Moines, Iowa

[73] Assignee: David B. Hawkins, Des Moines, Iowa ; a part interest

[22] Filed: Dec. 16, 1974

[21] Appl. No.: 532,813

Related U.S. Application Data

[62] Division of Ser. No. 371,262, June 18, 1973, abandoned.

[52] U.S. Cl. .............................. 214/334; 254/93 R
[51] Int. Cl.² ........................................ B60B 29/00
[58] Field of Search .......... 214/330, 331, 332, 333, 214/334, 85, 85.1, 16.1 DB, 501, 505, 77 R; 254/93 R

[56] References Cited
UNITED STATES PATENTS

| | | | |
|---|---|---|---|
| 1,914,098 | 6/1933 | Bean | 214/85.1 |
| 2,248,080 | 7/1941 | Hathaway | 214/85 |
| 2,549,489 | 4/1951 | Krause | 214/331 |
| 2,695,718 | 11/1954 | Epps | 214/333 |
| 2,779,484 | 1/1957 | Schramm et al. | 214/16.1 DB |
| 3,216,596 | 11/1965 | Perry | 214/85.1 |
| 3,667,621 | 6/1972 | Barlow | 214/77 R |

Primary Examiner—Robert J. Spar
Assistant Examiner—Lawrence J. Oresky
Attorney, Agent, or Firm—Zarley, McKee, Thomte & Voorhees

[57] ABSTRACT

A tow device for small planes and the like having a frame having front and rear ends and opposing sides. Front and rear wheels are rotably mounted on the frame and a means to power the wheels is provided. A winch driven by the power means extends rearwardly of the front of the frame and the rear end portion of the frame has an inclined ramp extending downwardly and rearwardly from the frame towards the ground. A stop plate is positioned forward of the ramp to engage and hold securely the front landing wheel of a towed airplane.

8 Claims, 5 Drawing Figures

TOWING DEVICE FOR SMALL PLANES AND THE LIKE

This is a division of application Ser. No. 371,262 filed June 18, 1973 now abandoned.

BACKGROUND OF THE INVENTION

The present invention is generally concerned with a towing device adapted for moving small aircraft and the like short distances without utilizing any power from the small aircraft.

Towing devices have been utilized with large commercial aircraft and with small aircraft in the past. However, the towing device specifically designed for large commercial jet aircraft are not adaptable for utilization with small planes such as Cessnas, Twin Beech engine aircraft and the like. Such large towing devices are too cumbersome for such small airplanes. Moreover, small aircraft often must be moved in relatively small spaces and be able to be moved by fairly sharp turns in such small spaces. In addition small aircraft are generally very light, i.e., usually less than a thousand pounds or so and therefore there is a need for a towing device which will securely hold the small plane to the towing device so that it will not become disengaged or loose and be jerked during movement which possibly could cause damage to the plane.

Accordingly, an object of the present invention is to provide a towing device for small planes and the like which allows for sharp movements in crowded areas and which securely holds the small plane to the towing device in a manner which will prevent disengagement of the plane or jerking of the aircraft due to motion caused by an insecure linkage between the small plane and the towing vehicle.

Another object of this invention is to provide a towing device which is itself small for convenient usage and economical manufacture.

Yet another object of this invention is to provide a towing device which can be utilized to move small aircraft even under adverse weather conditions such as snow and ice and the like.

A method of accomplishing these and other objects will become apparent from the following description of the invention.

DETAILED DESCRIPTION OF THE INVENTION

Figure 1:
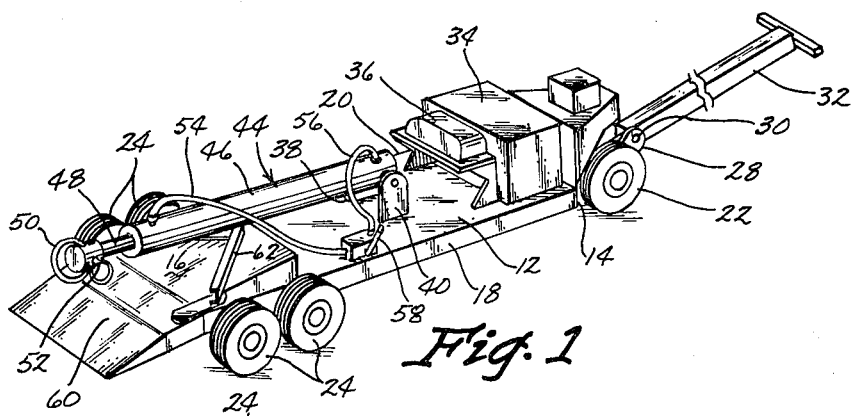
FIG. 1 is a side perspective view of the towing device of this invention.
Figure 2:
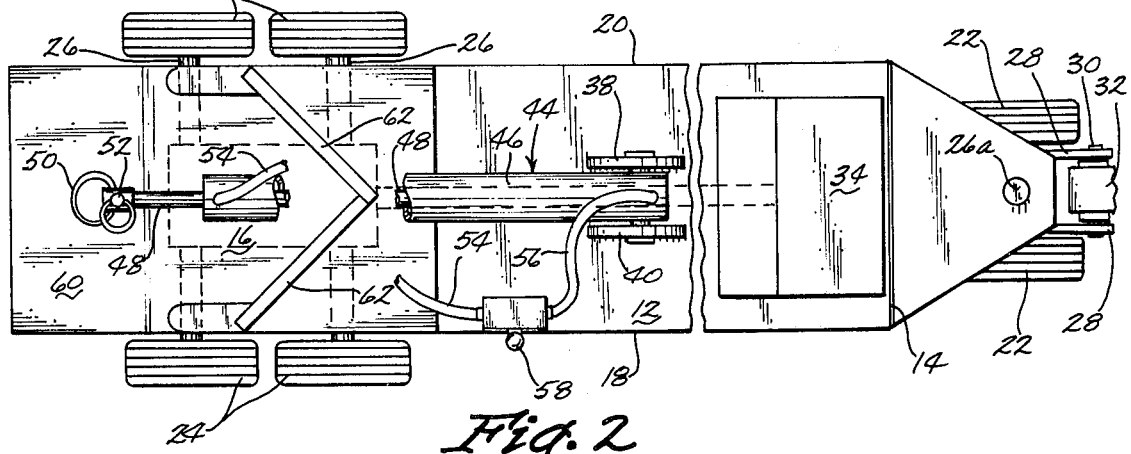
FIG. 2 is a plan view of the towing device shown in FIG. 1, with parts broken away.
Figure 3:
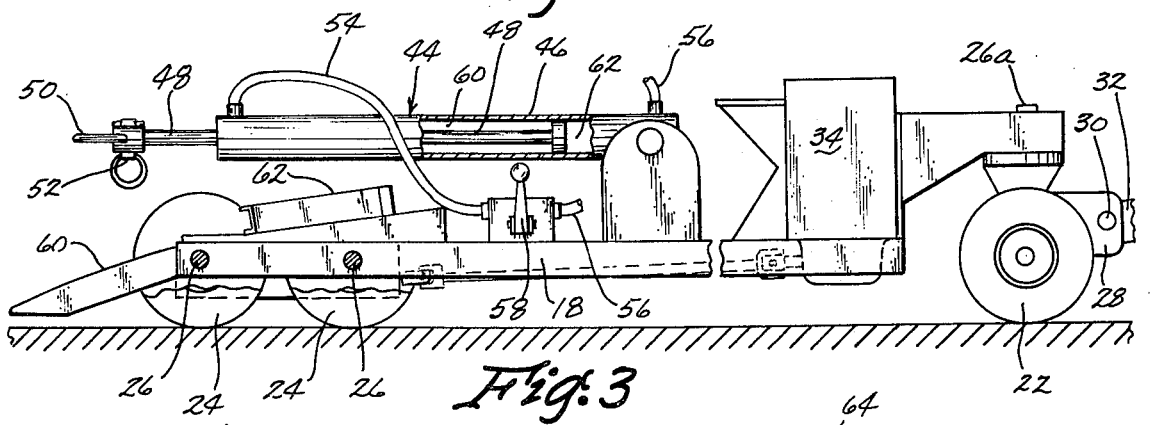
FIG. 3 is a side elevational view of the device shown in FIG. 1, with certain parts broken away to more clearly show the operational means of the winch.

With continuing reference to FIG. 1 unless specified otherwise, the tow device of this invention comprises a frame 12 having front and rear ends, 14 and 16 respectively, and opposing sides 18 and 20. The front and rear wheels 22 and 24 are rotably mounted on said frame by conventional axle means shown with respect to the rear wheels at 26 in FIG. 2. Preferably the front wheel means 22 comprises a pair of wheels mounted as shown in FIGS. 2 and 3. There a pair of front wheels 22 are pivotally mounted to the front of frame 12 by means of pin 26a which mounts the front wheel assembly to the front end 14 of frame 12 to provide pivotal movement about the horizontal axis of frame 12. The front wheel assembly comprises a pair of brackets 28 mounted on the front axle not shown. Brackets 28 are pivotally mounted to tongue 32 by pin 30 to provide movement of tongue 32 in an upward and downward fashion with respect to the horizontal axis of frame 12. Thus as can be seen the front wheel assembly will provide for sharp turns of the towing device either to the right or left of the towing device and the tongue 32 can be moved either to an up position or a down position in order to maneuver in tight places.

If desired, the front wheel assembly can comprise a single front wheel but preferably comprises dual front wheels for stability purposes.

Power means, diagrammatically illustrated as numeral 34 provides power to rear wheels 24. Preferably power means 34 is a rotary hydraulic motor.

Although not essential in the broadest terms of the invention, it is preferred that rear wheels 24 comprise a pair of rear wheel assemblies rotably mounted as shown in FIGS. 1 and 2. Providing dual rear wheels and dual rear axles provides a greater stability for the towing device. In addition, it is preferred that rear wheels 24 be spaced apart from frame 12 as shown in FIG. 2. Spacing rear wheels 24 apart from frame 12, or more correctly the sides 18 and 20 of frame 12, allows for better usage of the towing device in adverse weather conditions such as snow or ice. In such conditions the dual rear wheels can be operated in cooperative fashion by placing chain around both rear wheels spaced apart from side 18 which allows the chain to function as a track for greater traction purposes.

Power means 34, where such power means is a rotary hydraulic engine, is in communication with hydraulic fluid reservoir tanks 36 which functions as a reservoir for hydraulic fluid.

Mounted on frame 12 in upward protruding fashion are winch brackets 38 and 40. Pivotally mounted to brackets 38 and 40 by means of pin 42 is a winch assembly generally referred to as 44. Winch assembly 44 is driven by power means 34 and generally extends rearwardly of the front of frame 12.

Preferably winch assembly 44 is a hydraulic winch comprising a cylinder 46 having an extendable piston 48 slidably mounted within cylinder 46 for reciprocating movement therein.

Piston 48 has an aircraft engaging means 50 mounted on said piston for reciprocating movement therewith. Preferably aircraft engaging means 50 comprises a loop member 50 detachably engaging in the protruding end of piston 48. Loop member 50 is detachably engaged in the protruding end of piston 48 by means of pin 52.

Hydraulic fluid lines 54 and 56 are in communication with hydraulic cylinder 46 and control movement of hydraulic fluid within cylinder 46 by means of hydraulic control valve 58. Valve 58, depicted in the drawing as a lever device, controls hydraulic fluid flow into chamber 60 or chamber 62 by movement of the lever of said valve from a first position to a second position. When chamber 60 is filled piston 48 is forced to a closed position generally shown in FIG. 5 and when chamber 62 is filled with hydraulic fluid chamber 60 is empty and piston 48 is pushed rearward of the front of frame 12 to a fully extended position generally depicted in FIG. 4. Thus it can be seen that winch 44 will provide for reciprocating movement of piston 48 and aircraft engaging means 50.

Figures 4, 5:
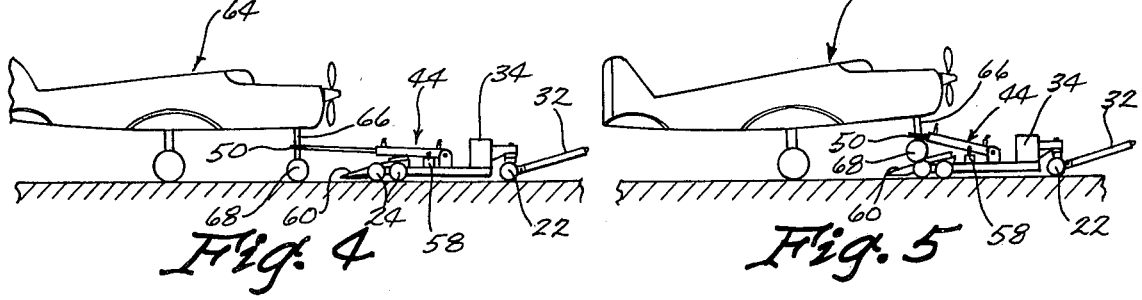
FIG. 4 is a diagrammatic illustration showing the towing device of FIG. 1 engaging a small plane.
FIG. 5 is a diagrammatic view showing the device of FIG. 1, with a small plane secured in towing position.

The rear end portion 16 of frame 12 has attached thereto an inclined ramp 60 extending downwardly and rearwardly therefrom toward the ground. A stop plate 62 is positioned forward of ramp 60. Preferably stop plate 62 is an inverted V-shaped member. FIGS. 4 and 5 diagrammatically illustrate the towing device of this invention in use. In FIG. 4 aircraft 64 is in a position ready to be moved onto and placed in secured relationship with respect to the towing device of this invention. More particularly, aircraft engaging means 50 of piston 48 is secured to the front landing gear 66 of aircraft 64. In the position shown in FIG. 4 piston 48 is in a fully extended position provided by adjusting hydraulic fluid control lever 58 to a position to provide through line 56 full fluid capacity in compartment in 62 which extends piston 48 to the position shown in FIG. 4. In FIG. 5 hydraulic fluid control lever 58 is moved to a second position to remove fluid from compartment 62 and to fill compartment 60 with fluid which causes piston 48 to move towards the front of frame 12 to the non-extended position shown in FIG. 5. Engaging means 50 engages front landing gear 66 and pulls aircraft 64 up ramp 60. Aircraft front wheel 68 engages stop ramp 62 which because of the forward pulling tension created by winch 50 is engaged securely in contact with stop plate 62.

The plane 64 being in the position shown in FIG. 5, is now ready for movement to any desired location. Because of the cooperative forces provided by winch 44 in its non-extended position shown in FIG. 5, and the front wheel 68 of aircraft 64 and the stop plate 62, aircraft 64 is securely engaged with the towing device and will not provide jerking movements during movement of the towing device by power means 34. The absence of such jerking motion will protect against possible damage of the small aircraft.

Aircraft engaging means comprises a loop member 50 which can directly engage the landing gear 66 as described herein or a stop attachment such as a nylon strap can be attached from loop member 50 to the landing gear 66 of aircraft 64. For convenient use, and because the planes are lightweight, a strap attachment is actually preferred.

Thus it can be seen that the invention accomplishes at least all of its stated objectives.

What is claimed is:

1. A tow device for small planes and the like having a landing gear comprising:
   a frame having front and rear ends and opposing sides;
   front and rear wheels rotatably mounted on said frame;
   a power cylinder pivotally connected to said frame for movement in a vertical plane;
   an extensible piston slidably mounted in said cylinder for reciprocating movement therewith;
   strap means pivotally mounted on said piston for connection to the landing gear of the plane;
   power means for powering said rear wheels and said power cylinder;
   the rear end portion of said frame having an inclined ramp extending therefrom downwardly and rearwardly toward the ground; and
   a stop plate positioned forwardly of said ramp in said frame for limiting the forward and sideways movement of the landing gear relative to said frame.

2. The device of claim 1 having a handle assembly mounted on the front of said frame for guiding said device.

3. The device of claim 2 wherein said handle assembly is pivotally mounted on said frame.

4. The device of claim 1 wherein said power means is a rotary hydraulic motor.

5. The device of claim 1 wherein said stop means is an inverted V-shaped member with the open end extending rearwardly to allow said stop to engage the front wheel of a towed plane.

6. The device of claim 1 wherein said wheels are dual wheels spaced apart from said frame.

7. A tow device for a small airplane having a vertically disposed landing gear, with a wheel on the lower end thereof; said device comprising:
   a frame having front and rear ends and opposing sides, front and rear wheels;
   a cylinder pivotally connected to said frame for movement in a vertical plane;
   an extension piston slidably mounted in said cylinder for reciprocating movement therewith;
   an aircraft landing gear engaging means pivotally mounted on said piston for reciprocating movement therewith from a retracted position wherein said engaging means is forwardly of said rear end of said frame to an extended position wherein said engaging means is rearwardly of said rear end of said frame;
   power means for powering said rear wheels and said piston and cylinder;
   control means associated with said cylinder for controlling the reciprocating movement of said piston between said extended position and said retracted position;
   said rear end of said frame having an inclined ramp extending therefrom downwardly and rearwardly toward the ground; and
   a stop plate positioned forwardly of said ramp on said frame, said stop plate being V-shaped with an open end extending rearwardly and being positioned to embrace said wheel of said airplane to limit sideways and forward movement thereof when said landing gear engaging means engages said landing gear and pulls said landing gear forwardly up the rearward end of said inclined ramp as said piston is retracted into said cylinder.

8. The device of claim 7 wherein said landing gear engaging means includes a nylon strap.

* * * * *